(12) United States Patent
Geka et al.

(10) Patent No.: US 8,403,562 B2
(45) Date of Patent: Mar. 26, 2013

(54) LINEAR MOTION GUIDE SYSTEM WITH WIPER SEAL

(75) Inventors: Toshiaki Geka, Kanagawa-ken (JP); Hideaki Ogura, Kanagawa-ken (JP); Shigeki Kakei, Gifu-ken (JP); Tamotsu Iwata, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 735 days.

(21) Appl. No.: 12/328,538

(22) Filed: Dec. 4, 2008

(65) Prior Publication Data

US 2010/0074564 A1    Mar. 25, 2010

(30) Foreign Application Priority Data

Dec. 11, 2007    (JP) .................... 2007-319697

(51) Int. Cl.
*F16C 33/00* (2006.01)
(52) U.S. Cl. ............... 384/15; 384/13; 384/45
(58) Field of Classification Search .......... 384/15, 384/43–45, 49, 50, 13; 277/549, 551, 576, 277/577
See application file for complete search history.

(56) References Cited

U.S. PATENT DOCUMENTS

| | | | | |
|---|---|---|---|---|
| 3,171,660 A | * | 3/1965 | Fisher et al. | 277/356 |
| 4,963,038 A | * | 10/1990 | Asano et al. | 384/15 |
| 5,775,813 A | * | 7/1998 | Saitoh | 384/15 |
| 6,155,717 A | * | 12/2000 | Michioka et al. | 384/15 |
| 6,705,430 B2 | * | 3/2004 | Michioka et al. | 184/5 |
| 6,877,900 B2 | * | 4/2005 | Mochizuki et al. | 384/15 |
| 7,717,621 B2 | * | 5/2010 | Kakei et al. | 384/15 |
| 7,740,406 B2 | * | 6/2010 | Kakei | 384/15 |
| 7,789,564 B2 | * | 9/2010 | Keller et al. | 384/15 |
| 2007/0223845 A1 | * | 9/2007 | Kakei et al. | 384/15 |

FOREIGN PATENT DOCUMENTS

| | | |
|---|---|---|
| JP | 2007255498 | 4/2007 |
| WO | WO2006/079397 | * 8/2006 |

* cited by examiner

*Primary Examiner* — James Pilkington
(74) *Attorney, Agent, or Firm* — Browdy and Neimark, PLLC

(57) ABSTRACT

A wiper seal is less in sliding resistance that is encountered when the seal slides over a raceway surface of a guide rail, better in wear-proof quality, rich in durability, and further easy to steadily install it to a slider. The wiper seal is installed on one end of the slider in a linear motion guide system to wipe away foreign materials adhered on the guide rail. The wiper seal is made of polyester polyurethane foam having a reticular skeleton texture of three-dimensional construction including open-cells therein, the polyester polyurethane foam being squeezed or compressed into from ¼ to 1/20 in thickness to form a compact blank of three-dimensional construction having porosity therein. The wiper seal is set to come into sliding contact with the guide rail 1 to exert a positive interference of from 0.1 mm to 0.05 mm.

4 Claims, 9 Drawing Sheets

Contact part of the wiper seal magnified to 50 times

Contact part of the wiper seal magnified to 200 times

Precursor of the wiper seal,
a portion corresponding to the contact part of the wiper seal
magnified to 50 times (A)

(B)

LINEAR MOTION GUIDE SYSTEM WITH WIPER SEAL

FIELD OF THE INVENTION

The present invention relates to a linear motion guide system suited for material-cutting machines used in severe working environment where much foreign matter including chips, debris, dirt, dusts, and so on occurs. More particularly, it relates to a linear motion guide system with a wiper seal that is effective to serve as seal against foreign matter.

BACKGROUND OF THE INVENTION

The linear motion guide systems are increasingly used in recent years in a design laying their guide rails bare to the working atmosphere with no use of conventional dustproof means such as telescopic covers and bellows from the view point of increasing ample spaces to be reserved for workplace during manufacturing process and for installation of required equipments, making the guide systems themselves compact or slim in construction, cost savings on installations, and so on. Thus, many of modern linear motion guide systems are customized to have appurtenances including any special dustproof means or highly-tight sealing units to keep any foreign matter away from entering inside the slider through any ends of the slider, lubricating means to feed the slider with lubricant, and so on to increase working performance, getting the guide systems more befitting for the working environment. The linear motion guide units have become commonly used in the machine tools including material-cutting machines, grinding machines, woodcutting machines, and so on which are expected to operate especially in severe working environment where much foreign matter including dirt, chips, debris, coolants, cutting fluids occurs.

There are known linear motion guide systems with highly-tight sealing means, which are disclosed in, for example the commonly assigned Japanese Laid-Open Patent Application No. 2007-255 498. With the prior linear motion guide system, the sealing means are mounted on forward and aft ends of a slider to absolutely seal off any clearance between the guide rail and the slider that fits over the guide rail for linear sliding movement, thereby making sure of highly sealing effect to keep any foreign matter away from entering inside the slider through any ends of the slider even if in the severe working environment in which much foreign matter including dirt, chips, debris, coolants, cutting fluids occurs. The highly-tight sealing means is comprised of a cassette constituted with a front panel and an enclosure integral with the front panel, three sheets of sealing plate stowed into the cassette, and a rear panel to come into close engagement with an open edge around the enclosure. The sealing plates are each made of a three-layer structure that is composed of an intermediate spongy medium flanked by skin layers, and lubricant is forcibly absorbed in pores or cells in the intermediate layer.

The slider in the prior linear motion guide unit constructed as stated earlier, though providing much interference against the guide rail enough to make sure of durability or reliability in highly-tight sealing condition, encounters adversely large frictional resistance when it slides over the guide rail. Moreover, modern linear motion guide units are expected better sliding quality and durability even in worse working environment where splashed coolants contaminate the atmosphere.

Meanwhile, some of the linear motion guide units in recent years are expected to operate with free of maintenance for lubrication at different methods of application and therefore equip themselves with a diversity of high-functional appurtenances, which are high in accuracy, sustainable for long-lasting service life and inexpensive in cost. Often the linear motion guide units are made in the roller type high in stiffness as well as accuracy and further needed to operate with reliability in worse or severer working environment. To improve the operating quality of the linear motion guide units in the worse working environment, the slider is equipped optionally at the forward and aft ends thereof with any appurtenances including the dustproof means or highly-sealing means to keep foreign matter or contaminants against entering inside the slider through the forward and aft ends of the slider, lubricating means to feed the slider with lubricant, and so on. To this end, the slider is equipped with a mounting plate to install the appurtenances such as lubricating means to the slider with reliability and relative ease.

Moreover, when the linear motion guide unit is expected to operate in the machine tools and so on that is forced to work in the severe atmosphere where much foreign material occurs as stated earlier, it is critical for the slider to keep foreign materials lying scattered on the guide rail against entering inside the slider even in such severe atmosphere, and also continue keeping better lubrication while the slider moves back and forth over the guide rail in a sliding manner, making certain of better sliding quality with less sliding resistance.

SUMMARY OF THE INVENTION

The present invention, therefore, has as its principal object to overcome the problems stated earlier and, in particular, to further improve the highly-tight sealing units disclosed in the commonly-assigned Japanese Laid-Open Patent Application No. 2007-255 498. The present invention is motivated to improve the linear motion guide units in their durability so as to operate for long-lasting service life in machine tools including cutting machines, grinding machines, woodcutting machines, and so on, which are forced to operate in the worse working environment where much foreign matter or contaminant including dust, chips, cutting debris, splashed fluids of cutting fluids, coolants, processing fluids, and so on is laid over the mating surfaces of the guide rail and the slider. More in detail, the present invention has developed the linear motion guide unit having a wiper seal that is better impregnated with lubricant enough to get slider as less as possible in sliding resistance against the guide rail and set to determined a proper clearance between the slider and the guide rail to keep the foreign materials from entering inside the slider. Moreover, the wiper seal constructed according to the present invention is designed to fit over the slider with ease through a mounting plate attached to any lengthwise end of the slider.

The present invention is concerned with a linear motion guide system with a wiper seal, comprising a guide rail made thereon with a lengthwise raceway surface and a slider allowed to move on the guide rail in a sliding manner by virtue of more than one roller; wherein a wiper seal is installed on any one of forward and aft ends of the slider; and wherein the wiper seal is made of polyester polyurethane foam having a reticular skeleton texture of three-dimensional construction including well-defined open cells therein, the polyester polyurethane foam being squeezed into from $1/4$ to $1/20$ in thickness to form a compact blank of three-dimensional construction having porosity therein.

In one aspect of the present invention, a linear motion guide system is provided in which the wiper seal is made of a compact sheet in which the foam is squeezed into $1/10$ in thickness. In another aspect of the present invention, a linear motion guide system is disclosed in which the wiper seal fits into a cassette that is installed on the one end of the slider and the wiper seal is kept in a way an inward edge thereof surrounds around the guide rail with coming into sliding engagement with the guide rail. In a further another aspect of the present invention, a linear motion guide system is disclosed in which the wiper seal comes into sliding contact with the guide rail 1 to exert a positive interference of from 0.1 mm to 0.05 mm.

In another aspect of the present invention, a linear motion guide system is provided in which the cells in the wiper seal are impregnated with lubricant. In a further another aspect of the present invention, there is provided a linear motion guide system in which the cassette to fit over the wiper seal has a locating pin therein while the wiper seal has a raised portion to come into sliding engagement with the raceway surface, and more than one wiper seal is put inside the cassette in a fashion that the locating pin fits into the raised portion of the wiper seal. In another aspect of the present invention, a linear motion guide system in which there is provided a mounting plate lying in opposition to the cassette and having a locating hole, and the locating pin planted in the cassette is made greater in height than an overall width in a sliding direction of the cassette to fit into the associated locating hole of the mounting plate to secure the cassette on the one end of the slider.

In another aspect of the present invention, a linear motion guide system is provided in which the wiper seal is secured to the one end of the slider through the mounting plate that is placed on an outward surface of an end seal lying on the one end of the slider, and the mounting plate is made to have a recess to fit over a lip of the end seal.

In another aspect of the present invention, there is provided a linear motion guide system in which the cassette has a surrounding side wall that is made in a double-walled construction to ensure some rigidity, the double-walled construction being composed of internal and external surrounding frames joined together with ribs. In a further another aspect of the present invention, there is provided a linear motion guide system in which the wiper seal is held between an end wall whose inward edge around the guide rail is kept from touching the guide rail 1 with a clearance and a closure whose inward edge around the guide rail is also kept from touching the guide rail 1 with a clearance.

In another aspect of the present invention, a linear motion guide system is provided in which the reticular skeleton texture of three-dimensional construction in the wiper seal includes a plurality of tiny open-cells to exhibit capillary action and porosity enough to soak up and hold the lubricant therein, thereby getting seepage of lubricant out of/into the open-cells easy and smooth.

In another aspect of the present invention, a linear motion guide system is disclosed in which a wiping means is attached through the mounting plate to the outward surface of the end seal on the one end of the slider, the wiping means being composed of a wiper seal assembly and a scraper installed on an outward surface of the wiper seal assembly, the wiper seal assembly being further comprised of the cassette, a pair of the wiper seals stowed inside the cassette, and the closure sheet lying so as to come into mating with the mounting plate, and in which the paired wiper seals are placed in a fashion that their open-cells are exposed over their substantially total surfaces against an outside surface of the guide rail and mating surfaces of the cassette including an inward surfaces of the interior frame and the end wall of the cassette, and the closure sheet.

With the linear motion guide unit constructed as stated earlier, the wiper seal is less in sliding resistance that is encountered when the seal slides over a raceway surface of a guide rail, better in wear-proof quality and rich in durability, and further easy to steadily install it to a slider.

BRIEF DESCRIPTION OF THE DRAWINGS

FIG. 13 is a schematic view of an installation to assess durability of the linear motion guide unit of FIG. 1 in the presence of coolant mist, in which FIG. 13(A) is a view in front elevation and FIG. 13(B) is a view in side elevation:

DETAILED DESCRIPTION OF THE PREFERRED EMBODIMENTS

The linear motion guide unit installed with wiper seals of the present invention is made most befitted to a variety of machines such as machine tools, and so on forced to operate in severe working environment that may cause much foreign matter or contaminant as recited earlier. Although the present invention will be described later in its preferred version two sheets of wiper seal are overlapped one on top of the other and are stowed inside a cassette in a way fitting over or conforming to the guide rail in a sliding manner, it will be understood that the present invention can be carried out in another modification in which hollow cylindrical slider fits over a circular guide shaft in a lengthwise sliding manner.

Most standard linear motion guide units have only end seals at forward and aft ends of a slider, which are attached to forward and aft end caps, one to each end, to close any clearance left between the slider and a guide rail. In contrast, the linear motion guide unit according to the present invention features the provision of a wiper seal installed additionally over the associated end seal at the end of the slider to make certain of keeping the foreign materials against creeping inside the slider along the guide rail even in tough working environment where much foreign material as recited earlier occurs.

Figure 1:
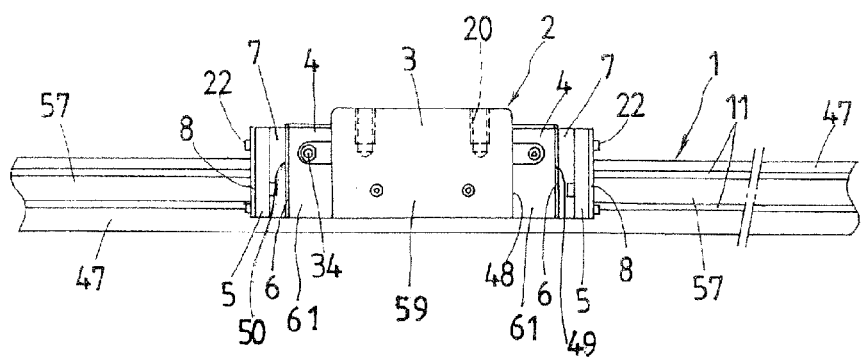
FIG. 1 is a partially cutaway view in front elevation of a preferred embodiment of a linear motion guide system according to the present invention.
Figure 2:
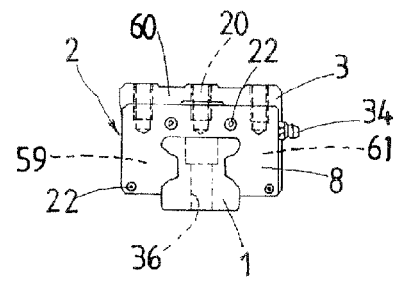
FIG. 2 is a view in side elevation of the linear motion guide system of FIG. 1.
Figure 3:
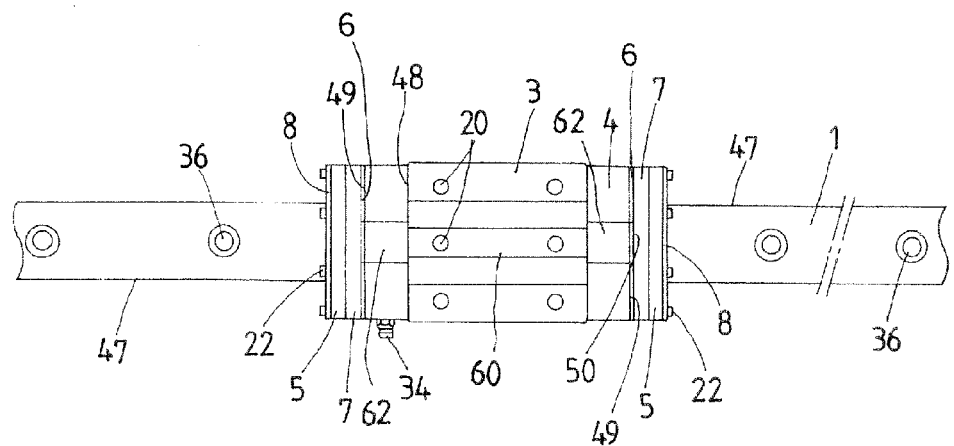
FIG. 3 is a view in plan of the linear motion guide system of FIG. 1.

The linear motion guide unit having the wiper seal according to the present invention will be described later with reference to the accompanying drawings showing a preferred embodiment of the present invention. The linear motion guide unit as shown in FIGS. 1 to 3 is mainly comprised of an elongated guide rail 1 having raceway surfaces 11 on lengthwise sides 47 thereof, and a slider 2 that fits over and conforms to the guide rail 1 to travel through rollers as rolling elements, not shown, in a sliding manner. The slider 2 is in general comprised of a carriage 3 made thereon with raceway surfaces, not shown, lying in opposition to the raceway surfaces 11 on the guide rail 1 to define load races, not shown, between them and made therein return passages, not shown, in parallel with the load races, end caps 4 secured to forward and aft ends 48 of the carriage 3, one to each end, and provided therein with turnaround passages to connect the load races with their associated return passages, end seals 6 attached on outward ends 49 of the end caps 4 to close clearances between the guide rail 1 and the slider 2, and more than one roller allowed to roll through circulating circuits composed of the load races, return passages and their associated turnaround passages.

With the linear motion guide unit constructed according to the present invention, a wiping means 10 made up of a wiper seal assembly 5 and a scraper 8 is connected to an outward end 50 of the end seal 6 on the slider 2 through a mounting plate 7 of synthetic resin molding, which is fabricated by injection molding process. The mounting plate 7 is counterbored at 13 to make a hole used to fasten the mounting plate 7. The guide rail 1 is made therein with bolt holes 36 at regular intervals, which are used to fasten the guide rail 1 to a stationary base or machine bed, and the like. On the other hand, the carriage 3 is made therein with threaded holes 20, which are used to hold any other component to the carriage 3.

With the linear motion guide units in which the rollers roll through the load-carrying races between the raceway surfaces 11 while experiencing heavy loads, it is inevitable to continue the positive application of lubricant, including grease and lubricating oil, to keep the rollers against metal-to-metal contact that might cause abnormal wear and scuffing. The end caps 4 are each made at either both sides or end surface thereof with a lubrication port to feed the application into the circulating circuit for the rollers. A grease nipple 34 joins any of the lubrication ports. The carriage 3 is made up of widthwise opposing bulgy sides 59 extending fore and aft along the sides 47 of the guide rail 1 and a top portion 60 straddling across the guide rail 1 to connect the widthwise opposing bulgy sides 59 with each other. Likewise the carriage 3, the end caps 4 are each made of widthwise opposing bulgy sides 61 parallel to the bulgy sides 59 of the carriage 3 and a top portion 62 corresponding to the top portion 59 of the carriage 3 to straddle across the guide rail 1 to connect the widthwise opposing bulgy sides 61 with each other. Moreover, the mounting plate 7 as shown in FIGS. 1 to 4 and 6 is also composed of widthwise opposing bulgy sides 54 lying across the end seal 6 in opposition to the sidewise bulgy portions 61 of the associated end cap 4 and a top portion 55 lying across the end seal 6 in opposition the top portion 6 of the end cap 4 to connect the widthwise opposing bulgy sides 54 with each other.

Figure 4:
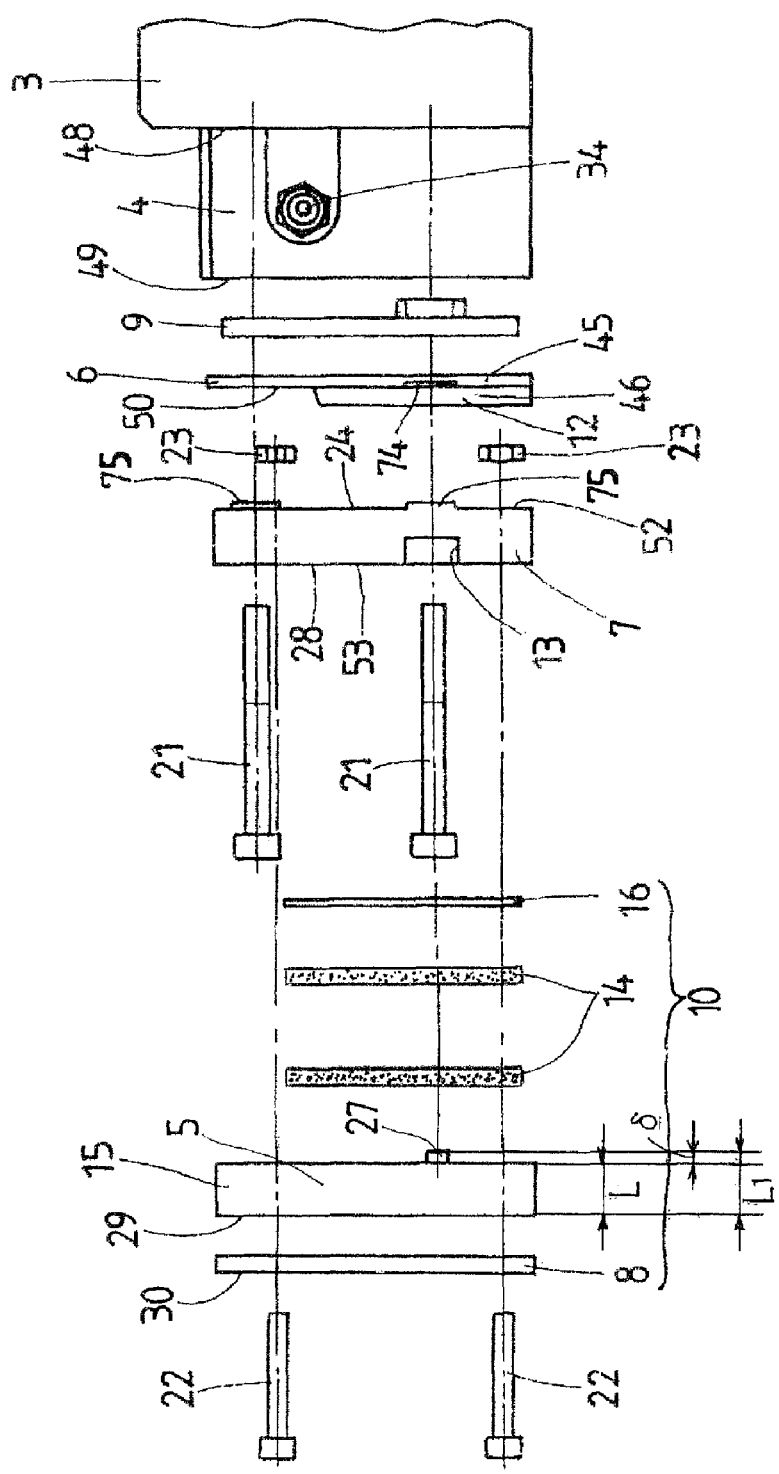
FIG. 4 is an exploded view of any one of forward and aft ends of a slider on the linear motion guide system of FIG. 1.

The mounting plate 7 as shown in FIG. 4 is installed on the outward end 50 of the end seal 6 on the slider 2 to connect the slider 2 with the wiping means 10 that is to be optionally added to the slider 2. The linear motion guide unit used in specific working environment hopes to put in the wiping means 10 so that the slider 2 functions better to cope with the specific environment or worse working atmosphere where much foreign matter as stated earlier is caused. The wiping means 10 is composed of the wiper seal assembly 5 and the scraper 8, and especially most befitted for the incorporation into the machine tools that is intended to operate in the worse working environment where the foreign matters as recited earlier are much caused.

With the linear motion guide unit constructed as stated earlier, a lubricant-impregnated member 9 fits into a recess sunk below the outward end 49 of the end cap 4 to realize the maintenance-free operation for lubrication. The mounting plate 7 is placed in a geometry an inward end surface 24 thereof faces the outward surface 50 of the associated end seal 6, and secured to the carriage 3 together with the end seal 6 and the end cap 4 by means of fastening bolts 21 that extend past both the end seal 6 and the end cap 4 into the carriage 3. The wiping means 10 is installed on another end surface or outward end surface 28 of the mounting plate 7 with fastening screws 22.

Figure 5:
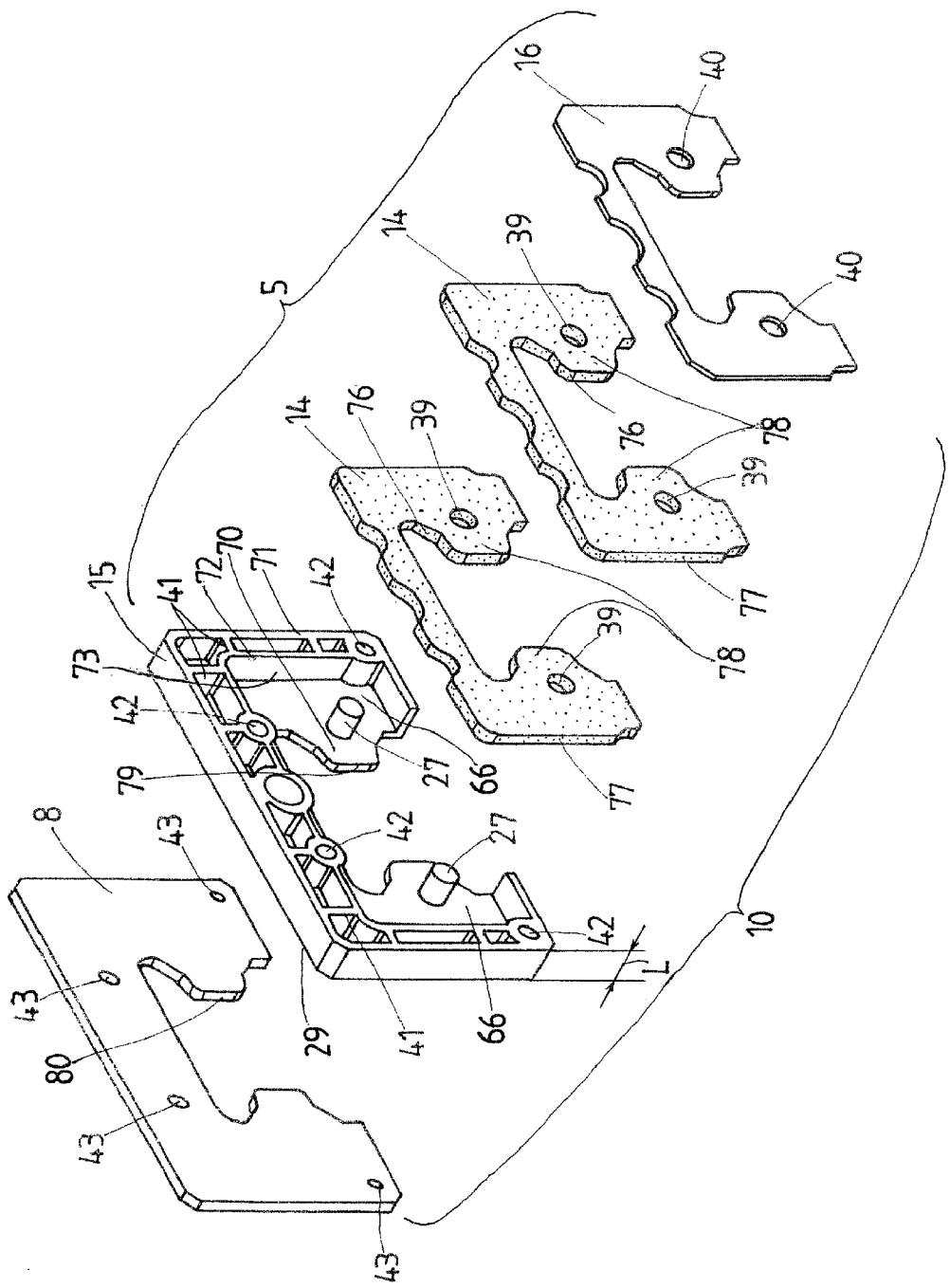
FIG. 5 is an exploded view in perspective of a wiping means having a wiper seal therein shown in the exploded view of FIG. 4.
Figure 6:
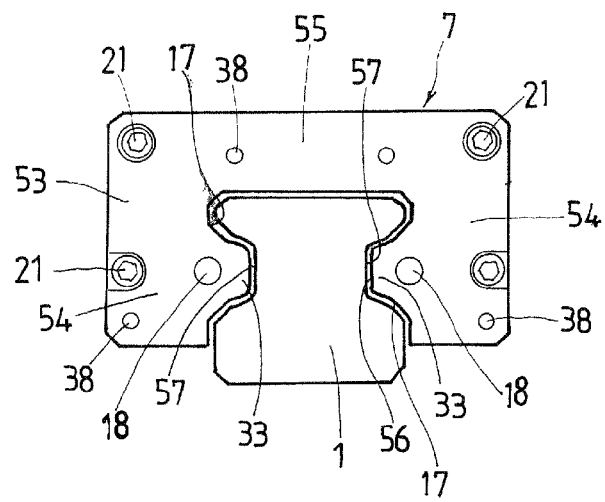
FIG. 6 is a view in side elevation of a mounting plate installed on the associated end of the slider shown in the exploded view of FIG. 4.
Figure 7:
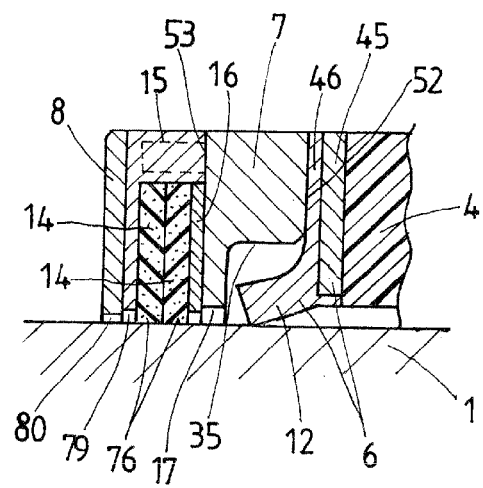
FIG. 7 is fragmentary view in transverse section of the end of the slider of FIG. 6, on which the wiping means is installed.

The wiping means 10 as shown in detail in FIGS. 4 and 5 is made up of the wiper seal assembly 5 and the scraper 8. The wiper seal assembly 5 is composed of an open cassette 15, a pair of wiper seals 14 stowed inside the cassette 15, and a closure sheet. The wiper seal assembly 5 is placed to come into engagement with the outward surface 28 of the mounting plate 7 while the scraper 8 is on an outward end surface 29 of the wiping means 10. The fastening screws 22 are applied on an outward end surface 30 of the scraper 8 to stretch through holes in the scraper 8 and the wiper seal assembly 5, then mating with nuts 23 in the mounting plate 7 to tighten the wiper seal assembly 5 against the mounting plate 7. The mounting plate 7 is made concaved to have an inside edge 17 that fits over or conforms to the guide rail 1 in a way out of touch with the guide rail 1 to leave a slight clearance 56 between them as shown in FIGS. 6 and 7. Moreover, the inside edge 17 is raised at 33 towards to get closer to deep groves 57 lying between the load-carrying races 11 on the guide rail 1. Ridges 75 made on the mounting plate 7 are intended to fit into their associated counter bores 74 in the end seal 6 to make it easier to locate the mounting plate 7 with respect to the associated end seal 6. The mounting plate 7, for example, is made of a composite product of an inverted U-shape in plan view, in which the metal core, not shown, is embedded inside a major part of synthetic resin. The metal core, because of no raised portion, helps the injected synthetic resin flow evenly from a sprue at the raised portion into a mold cavity to entirely encapsulate the metal core inside the major part.

The linear motion guide unit of the present invention, especially, features a wiper seal 14 reduced as less as possible compared with the conventional sealing plate or lubricating plate in sliding resistance that might be encountered when the slider 2 slides over the guide rail 1, and thus better in wear proof and durability. With the linear motion guide unit of the present invention, the wiper seal 14 is made of polyester polyurethane foam having a reticular skeleton texture of three-dimensional construction including well-defined open pores or cells therein. The polyester polyurethane foam is squeezed prior to use for the wiper seal 14 into from ¼ to 1/20, preferably 1/10 in thickness to form a compact blank of three-dimensional construction having porosity therein.

Figure 9:
FIG. 9 is an SEM image of the contact part of the wiper seal magnified to 200 times.
Figure 10:
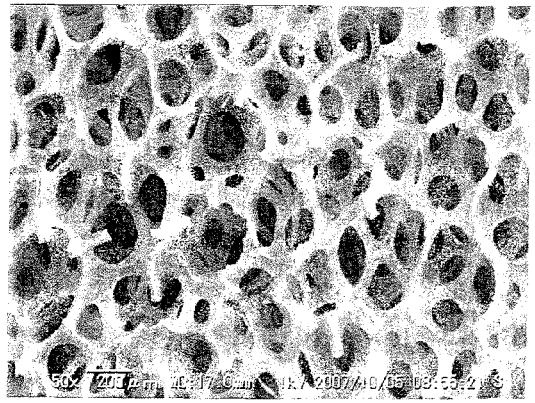
FIG. 10 is an SEM image showing a precursor of the wiper seal, a portion corresponding to the contact part of the wiper seal being shown magnified to 50 times.

The compact blank or a precursor in FIG. 10 for the wiper seal 14 (shown in FIG. 8 or 9) is made of polyester polyurethane foam, which is subjected to a specific treatment to remove foam skin occurring at the time of foaming process to exhibit well-defined three-dimensional construction having a porosity of 97% or more.

With the linear motion guide unit constructed according to the present invention, especially, the wiper seal assembly 5 can be simply mounted on the outward end 50 of the end seal 6 with the aid of the mounting plate 7 while the scraper 8 to exclude relatively coarse foreign matter is installed over the outward end surface 29 of the cassette 15 in the wiper seal assembly 5. The wiper seal 14 is made raised at 78 in opposition to the first raceway surfaces 57 for the load-carrying races 11 on the guide rail 1. The cassette 15 has an inward edge 79 conforming to the raceway grooves 59 on the guide rail 1 and holes 42 to allow the fastening screws 22 extending through there, while the scraper 8 has an inward edge 80 conforming to the raceway grooves 59 on the guide rail 1 and holes 43 to allow the fastening screws 22 extending through there. The scraper 8 is made of a thin steel sheet and secured with the fastening screws 22 in a geometry that the scraper 8 is kept from touching the guide rail 1 with a minute clearance. The seal wipers 14 as shown in FIG. 5 are made in a fashion that the reticular skeleton texture of open-cells is exposed over their substantially total surfaces to an outside surface of the guide rail 1 and mating surfaces of the cassette 15 including an inward surface 73 of an interior frame 72, an inward surface of the end wall 66 and inward surface of the closure sheet 16.

With the liner motion guide unit of the present invention, the mounting plate 7 to install the wiping means 10 on the slider 2 is secured to the outward surface 50 of the end seal 6 in a way lying between the wiping means 10 and the end seal 6. The wiping means 10 as shown in FIG. 4 is comprised of the wiper seal assembly 5 and the scraper 8 attached on the outward surface 29 of the cassette 15, the wiper seal assembly 5 including a plurality of, two in the illustrated version, wiper seals 14 and the closure sheet 16, which are stowed inside the cassette 15.

The cassette 15 is to protect the wiper seals 14 against foreign materials and made in dimension to fit over the wiper seals 14 in a way the wiper seals 14 are allowed coming into close contact along their inward edges with the guide rail 1 to exert any positive interference with the guide rail 1 of 0.1 mm or less, for example 0.05 mm to 0.1 mm. The cassette 15 is made in a double-walled construction to ensure some rigidity, in which internal and external surrounding frames 71, 72 are joined together with ribs 41 and closed at any one of their open ends opposite lengthwise of the slider 2 by means of the end wall 66. The wiper seals 10 fit snugly into the cassette 15 in a relation that their peripheral edges come into close contact with the inward surface 73 of the interior surrounding frame 72. The end wall 66 to close any one open end of the cassette 15 is recessed to fit over or conform to the guide rail 1 in a fashion that the inward edge 79 of the end wall 66 around the guide rail 1 is kept from touching the guide rail 1 with a minute clearance. The end wall 66 of the cassette 15 has sidewise opposing raised portions 70 approaching the associated raceway surfaces 11 on the guide rail 1. At the raised portions 70, there are integrally provided locating pins 27 that fit into holes 39 in the wiper seals 14 to locate the wiper seals 14 in such a relation that the wiper seals 14 are accurately kept in close engagement with the raceway surfaces 11.

As stated earlier, the cassette 15 is made to complete the wiper seal assembly 5 in which plural or two sheets of the wiper seals 14 are stowed together with the closure sheet 16 inside the cassette 15.

The closure sheet 16 has holes 40 to allow the locating pins 27 of the cassette 15 extending through there. As a result, the closure sheet 16 comes snugly into engagement with the inward surface 73 of the cassette 15 to close the cassette 15 in liquid tightness, thereby holding two sheets of wiper seals 14 against the end wall 66 while keeping lubricant in the wiper seals 14 from escape out of the cassette 15.

With the linear motion guide unit of the present invention, the reasons that plural sheets, especially two sheets in the current illustrated embodiment, of the wiper seals 14 are stowed inside the cassette 15 are as follows. The wiper seals 14 are each made of a compact blank of 2 mm in thickness in which the polyester polyurethane foam of 20 mm in thickness is squeezed into 1/10 in thickness. Thus, two sheets of the wiper seal 14 provide the wiper seals 14, 14 of 4 mm thickness in all. More than one wiper seal 14 stacked one on top of each other is more effective in sealing performance of excluding foreign materials because any foreign materials eluding the first wiper seal might be trapped in succeeding other wiper seals. Moreover, the wiper seal 14, even though finished with high accuracy, can't be free of variation in size from product to product, variation caused by cutting process and tolerance accompanied in error of shape. As the result of variations as recited earlier, only one wiper seal 14 can't ensure the interference uniform throughout around the guide rail 1. In contrast, more than one wiper seal complements the variation in the interference each other to make sure of the interference uniform throughout around the guide rail 1 to keep effectively free of foreign materials. In just one wiper seal of the same in thickness as the two sheets of the wiper seals 14, for example, the single wiper seal, although equal apparently in contact area against the guide rail 1 compared with two sheet of the wiper seals 14 stowed inside the cassette 15, is more apt to fit over the guide rail 1 in a lopsided condition to get the interference uneven around the guide rail 1, thereby becoming less in the sealing performance of excluding foreign materials. The sealing performance of excluding foreign materials will improve as the number of the wiper seals increases. Nevertheless, the overall sealing performance to exclude foreign materials can't be said improving in direct proportion as the number of the wiper seals increases. Two sheets of the wiper seals was in place in light of the amounts of interference and sliding resistance both of which would bear on sealing quality of excluding foreign materials.

The locating pins 27 planted in the cassette 15 as shown in FIG. 4 are greater in height L1 by δ than the overall width L in the sliding direction of the cassette 15. The tips of the locating pins 27 raised above the overall width of the cassette 15 fit snugly into hole 18 in the mounting plate 7 as seen in FIG. 6. Engagement of the location pins 27 with the closure sheet 16 serves keeping the wiper seal assembly 5 against breaking open even when the cassette 15 has fallen away from the mounting plate 7 while in installation of the wiping means 10 on the slider 2 or after the closure sheet 16 has bulged out of the edge of the cassette 15 because the wiper seals 14 swelled owing to their elasticity. Moreover, the locating pins 27 contribute to easy installation of the wiper seal assembly 5 to the mounting plate 5.

The end seal 6 attached to the outward end 49 of the end cap 4 as shown in FIG. 7 is composed of a metal core 45 and rubber coat 46 baked on the metal core 45. The rubber coat 46 is made with a lip 12 that extends from the edge of the end seal 6 towards the guide rail 1 to keep close engagement with the guide rail 1 while sliding along the guide rail 1. The mounting plate 7 is made to have a recess 35 extending along the inside edge thereof so as to fit over or accommodate the lip 12. The mounting plate 7 at an inward surface 52 thereof comes into mating with the rubber coat 46 of the end seal 6 while at an outward surface thereof 53 recedes somewhat to leave a bit clearance between the inside edge 17 and the guide rail 1. The outward surface 53 of the mounting plate 7 helps install the wiping means 10 on the associated end cap 2 with accuracy and steadiness.

Figure 8:
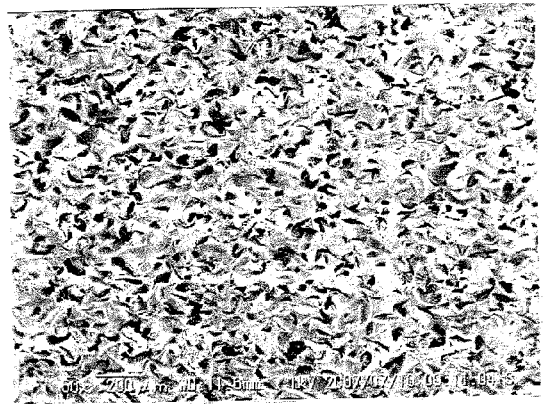
FIG. 8 is an SEM image (=scanning electron microscope image) showing a contact part of the wiper seal magnified to 50 times.

FIGS. 8 and 9 are SEM images of the wiper seal 14. In FIG. 8, there is shown the inside edge 76 of the wiper seal 14 to make sliding contact with the outward surface of the guide rail 1. This SEM image shows the contact part in transverse section magnified to 50 times. FIG. 9 is the SEM image where the same contact part as in FIG. 8 is further magnified to 200 times. In FIG. 10, there is shown the state of a precursor for the wiper seal 14. The precursor is made of polyester polyurethane foam, which is subjected to a specific treatment to perfectly remove foam skin formed on the open-pore or cell wall at the time of foaming process to exhibit well-defined three-dimensional construction. This SEM image shows a portion of the precursor in transverse section corresponding to the contact part of the wiper seal 14, which is shown magnified to 50 times. In FIG. 8 or 9, thus, there is shown the reticular skeleton texture of three-dimensional construction in which the precursor of FIG. 10 is compacted into 1/10 in thickness. The wiper seal 14 is made by cutting the compact sheet or compact blank into any desired shape with using cutter or the like. The compact blank for the production of the wiper seal is better in durability. As being proved in the SEM images of FIG. 8 or 9 showing only the contact part of the wiper seal, it became clear that the overall wiper seal 14 was made in the reticular skeleton texture of three-dimensional construction in which the open-pores or continuous cells spread uniformly throughout the wiper seal 14.

Physical properties of compact blank for the wiper seal 14 were as follows: number of cells was 70 cells/25 mm; density, 0.58 g/cm$^3$; porosity, 52%; elongation, 100%; tensile strength, 10 kg/cm$^2$; restitution elasticity, 30%; surface hardness, 60 deg; and permanent strain, 5%.

The wiper seal 14, as stated earlier, is made of material resembling felt, which has the reticular skeleton texture of three-dimensional construction including open-pores or cells of fine meshes. With common polyester polyurethane foam, a blowing agent to get polyester polyurethane foaming adheres in the form of thin film material to cell walls of pores or cell a half of which is closed-cells and the other half is open-cells. With the compact blank for the wiper seal 14 of the present invention, in contrast, the polyester polyurethane foam was subjected to a specific treatment, for example dissolving process by any solvent, to remove foam skin or thin film material from the cell walls to exhibit the better capillary action and higher porosity than ever, thereby increasing the impregnation rate of liquid or lubricant and further getting seepage of lubricant out of/into the open-cells easier or smoother than before. Squeeze of the precursor into a proper compression ratio resulted in substantial increase of surface area that would come into contact with the mating surface or the outside surface of the guide rail 1, thereby helpful in significantly enhancing the quality to extrude foreign materials lying over the outside surface of the guide rail 1. The wiper seal 14 was constituted with a material that was so high in cell or pore density as to have capillary power enough to absorb and retain much lubricant therein. As the wiper seal 14 gets increased in density by squeezing or compression, it is great in mechanical strength so as to resist occurrence of damages such as tearing or ripping. Moreover, the wiper seal 14 is superior in resistance to chemicals, oils, heats and cryogenic atmosphere. The wiper seal 14 is impregnated with any oily lubricating fluids to wipe away foreign materials, especially coolant and so on adhered over the guide rail 1 when sliding over the guide rail 1 while keeping close contact with the guide rail 1.

The wiper seal 14 with the better qualities as recited earlier, even if the interference against the guide rail 1 is 0.1 mm or less, can bring out the performance to wipe away the foreign materials, thereby realizing the slider 2 that is allowed to slide over the guide rail 1 while keeping an adequate clearance spaced away from the guide rail 1. The clearance between the wiper seal 14 and the guide rail 1, even if either of a little too large and a little too small, makes against the wiper seal 14 in wiping quality to extrude the foreign materials. With the preferred embodiment of the present invention, the wiper seal 14 was set to exert an adequate positive interference with the guide rail 1 of from 0.05 mm to 0.1 mm.

With the linear motion guide unit constructed as stated earlier, moreover, the more the wiper seals 14 that are stacked on top of each other, the better will be the quality to wipe away the foreign materials, but the greater will be the sliding resistance that is encountered when the slider 2 slides over the guide rail 1, thereby getting the linear motion guide unit awkward in operation. In order to serve more satisfying quality to wipe away the foreign materials with the wiper seals 14 as less in number as possible, the wiper seal assembly 5 is preferably constructed to include two sheets of the wiper seal 4 inside the cassette 15. The wiper seals 14 are placed ahead of the associated end seals 6 while closing the clearance between the guide rail 1 and the slider 2 to help the end seals 6 to wipe away the foreign materials including coolants and so on from the guide rail 1.

Of the wiper seals 14 squeezed or compacted into various thicknesses in the range of from 1/4 to 1/20 the thickness of the precursor, the wiper seal 14 squeezed in to the critical value of 1/4 had number of cells of 80 cells/25 mm; density, 0.40 g/cm$^3$; porosity, 67%; elongation, 100%; tensile strength, 4 kg/cm$^2$; restitution elasticity, 40%; and surface hardness, 25 deg. The wiper seal 14, because less in tensile strength, is liable to cause concern about durability. Nevertheless, this wiper seal 14 squeezed into 1/4 thickness is permissible in the design specification in which the slider 2 is allowed to operated with less sliding resistance because of the environment less in occurrence of foreign materials. In contrast, the wiper seal 14 compacted into another critical value of 1/20 becomes greater in tensile strength while less in porosity. That is, the more compacted wiper seal 14 is high in sealing quality to exclude foreign materials.

With the linear motion guide unit of the present invention, the compact blank for the wiper seal 14 was squeezed into any compressed ratio between the lower limit of 1/4 and higher limit of 1/20 in thickness, or from 1/4 to 1/20, preferably into 1/10 in thickness.

Figure 11:
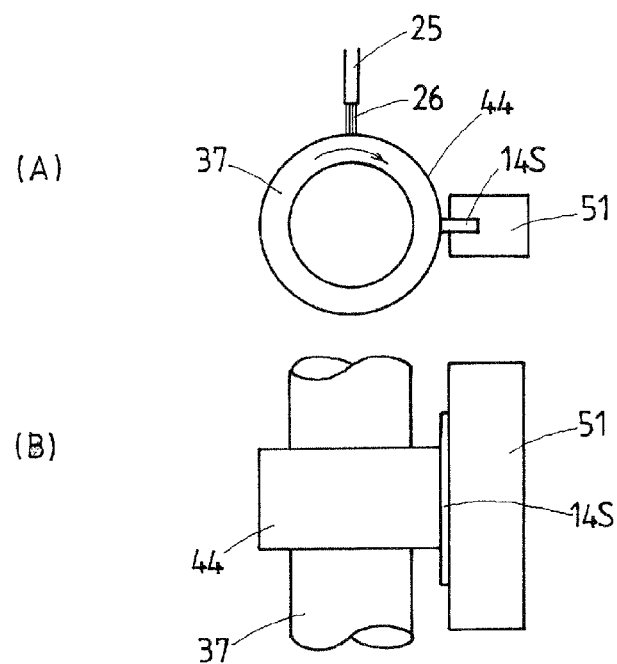
FIG. 11 is a schematic view of a tester to identify wear of a product to be finished into the wiper seal of FIG. 5.

In FIG. 11, there is shown a tester to identify wear of a product to be finished into the wiper seal 14. With the tester illustrated in FIG. 11, a specimen 14S of 50 mm×5 mm×2 mm of compact blank to be made into the wiper seal 14 was caught by a holder 51 while urged against a circular surface 44 of a revolving cylinder 37 to come into sliding contact with the circular surface 44 with a fixed interference resulting between them. Wear of the specimen 14S was observed while coolant 26 intermittently fails in drops out of a nozzle 25.

The wear tests of the product were carried out under the following conditions: number of revolutions of the revolving cylinder 37 at constant speed was 11 rpm; velocity of circular sliding surface 44, 2 m/sec; lubricant (general-purpose industrial oil) impregnated, R 0220; coolant 26, YUSHIROKEN SYNTHETIC #663 (registered trademark) diluted 20 times and applied at the rate of 50 cc/2 hr; and distance for the test, 150 km. After the wear tests, the specimen 14S for the wiper seal 14 was observed to be just worn the extent where there was found the presence of trace amounts of paltry wear.

Figure 12:
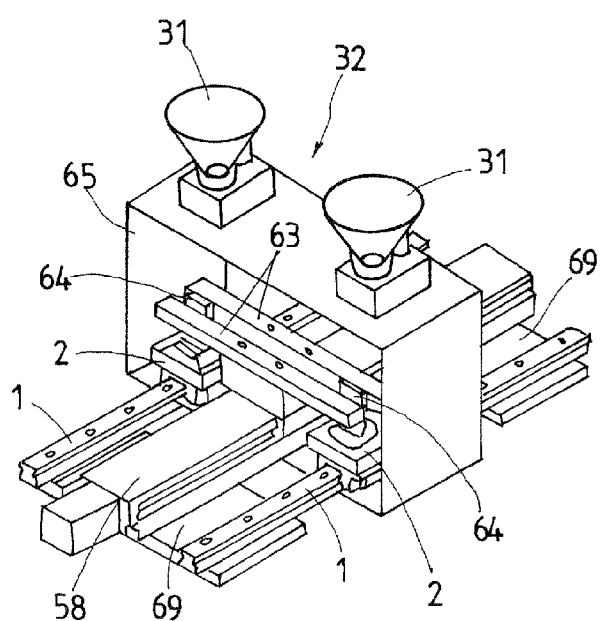
FIG. 12 is a schematic view of an installation to assess durability of the linear motion guide unit of FIG. 1 in dusty environment.

In FIG. 12, there is illustrated an installation 32 to assess durability of the linear motion guide unit used in the dusty environment. With the durability testing machine 32, the slider 2 with the wiper seal 14 fits for linear sliding movement over a pair of the guide rails 1 fixed on a horizontal machine bed 69 while a driving unit 58 is installed between the paired guide rails 1 to actuate back and forth the slider 2. The driving unit 58 has crosswise arms 63, which makes engagement with their mating parts 64. Actuation of the driving unit 58 causes the slider 2 to move back and forth along the guide rail 1. Moreover, two hoppers 31 are installed on a frame 65 to get powdery material come down over the guide rails 1. After the slider 2 traveled on the guide rails 1 over 100 km, the observation was carried out to identify how much of foreign materials eluded the wiper seal 14 and entered inside the slider 2.

The durability tests were carried out under the following conditions: traveling velocity of the slider 2 was 300 mm/sec at the maximum speed and 278 mm/sec at the average speed; powdery material, a powder of iron having grain size of 300 μm or less (125 μm or more; 60% min, 75 μm or more; 70% min) and hardness of HRC 40~50, and an amount of iron powder fed out of the hopper 31, 1 g/hour (corresponding to 1 g/1 km of traveling of the slider 2). After the durability tests, the powdery materials were hardly found on the guide rail 1 inside the slider 2.

Figure 13:
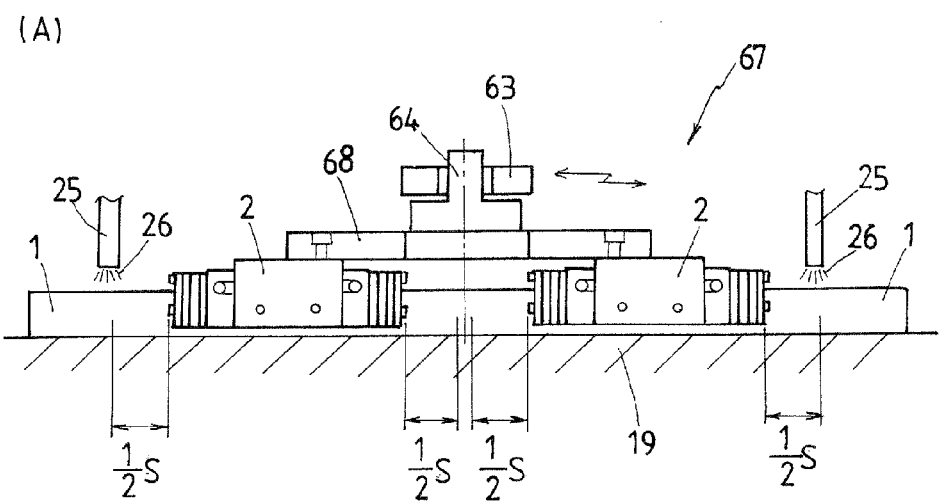
Figure 13:
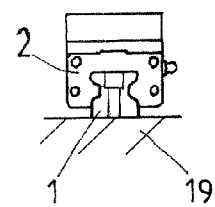

In FIG. 13, there is another version 67 of durability testing machine to assess durability of the linear motion guide unit in the presence of coolant mist, in which FIG. 13(A) is a view in front elevation and FIG. 13(B) is a view in side elevation. With the durability testing machine 67, a pair of the slider 2 fits for linear sliding movement over the guide rail 1 fastened on a horizontal machine base 19. A pair of sliders 2 are joined to each other with a connector 68, which has the mating part 64 that makes engagement with the crosswise arm 63 fastened to the driving unit to move back and forth the slider 2. Nozzles 25 to spray the coolant 26 are placed above the guide rail 1 forward and backward in the sliding direction of the slider 2. After the driving unit has been actuated, the slider 2 is allowed travel over an equal stroke or ½ stroke (½ S or 0.5 S) in opposite directions along the guide rail 1.

With the wear of the wiper seal 14 in the durability testing machine 67 was observed after traveling across 5000 km of the slider 2 along the guide rail 1 while the coolant 26 was sprayed out of the nozzle 26.

The wear tests in the durability testing machine 67 were carried out under the following conditions: traveling stroke was 300 S; and coolant 26, YUSHIROKEN SYNTHETIC #663 (registered trademark) diluted 20 times and sprayed at the amount of 5 cc only once an hour's time. The wear test results as shown in FIG. 14 were observed at the leading or contact tip of the wiper seal 14 and the leading tip of the end seal 6.

Figure 14:
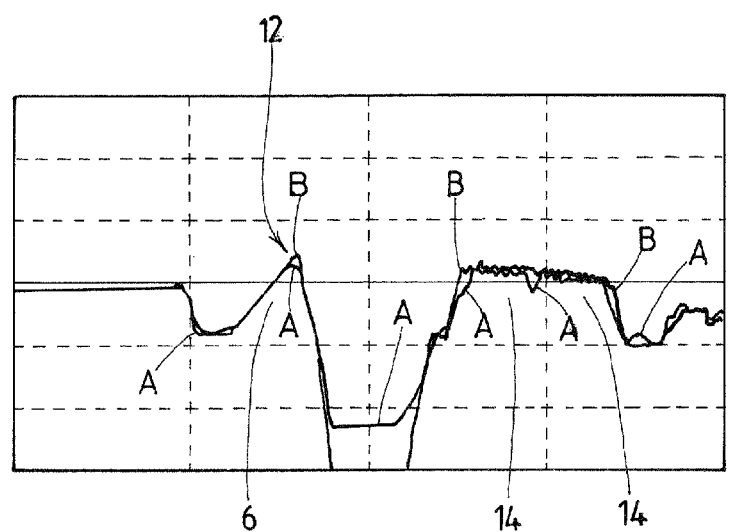
FIG. 14 is a graphical representation showing results measured in the installation of FIG. 13 at the contact parts of the end seal and wiper seal of the linear motion guide unit constructed according to the present invention.

With the graphic representation in FIG. 14, a graph of sign A shows conditions of sliding surfaces of the end seal 6 and stacked wiper seals 14 observed after traveling over 5000 km, whereas another graph of sign B shows conditions of sliding surfaces of the end seal 6 and stacked wiper seals 14 observed prior to the traveling of the slider 2 along the guide rail 1. As understood from FIG. 14, wear was found little on all the wiper seals 14 and end seal 6 even after long-distance traveling. That is, the end seal 6 was observed worn away 0.06 mm or so at the lip 12 thereof, but as a whole suffered no damage. Thus, the linear motion guide unit with wiper seals 14 constructed according to the present invention succeeded in keeping the slider 2 free of foreign materials including gust or dirt, cutting chips and debris, coolants or metal-cutting fluids, and so on for long-lasting service life.

Figure 15:
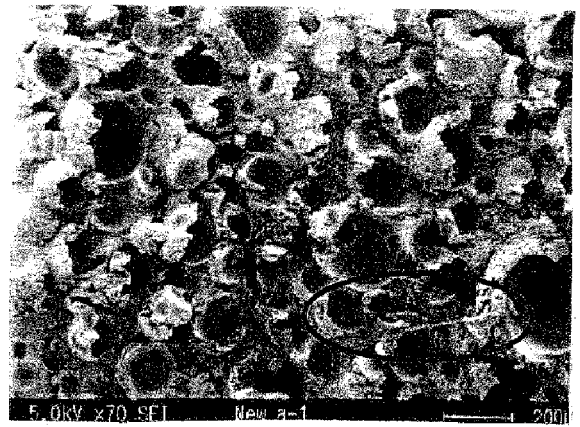
FIG. 15 is an enlarged microscopic image showing a contact part of a currently-used sealing member made of urethane foam.
Figure 16:
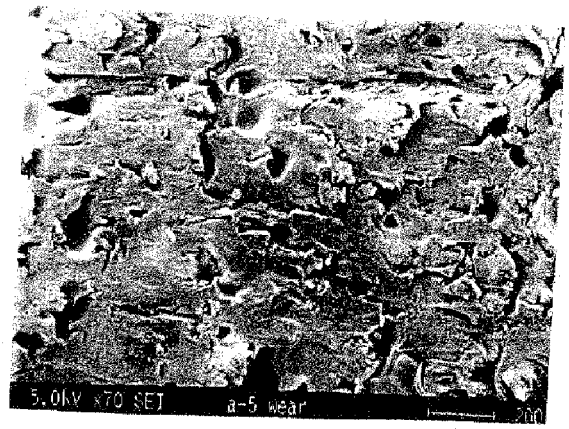
FIG. 16 is an enlarged microscopic image showing a contact part of the sealing member made of FIG. 15, but imaged after durability test.

In FIGS. 15 and 16, there are illustrated enlarged microscopic images one of which shows a currently-used sealing member made of common urethane foam in which the foam skin remained intact and no squeeze was applied and another of which shows the currently-used sealing member observed after the durability test. The sealing member of common urethane foam has the structure there are many pores or cells different in size, a half of which is closed-cells and the other half is open-cells. As seen in FIG. 15, the pores or cells different in size are made open in circular shape at the tip part coming into sliding contact with the guide rail 1. What likes a faint line inside an oval circle in FIG. 15 is considered to show a scar of scuff that might occur at the time of cutting with use of a powerful jet of water. The sealing member of common urethane foam, after traveling of 500 km in misty atmosphere of coolant in the durability testing machine 67 of FIG. 13, varied at the contact part thereof from the texture of FIG. 15 into that of FIG. 16. With the texture imaged in FIG. 16, it was identified that most cells or pores in the sealing member of common urethane foam had got clogged or closed because of sliding contact of the sealing member with the guide rail, preventing the lubricant from oozing into or out of the sealing member, thereby causing much wear. Thus, the sealing member of common urethane foam may be considered inferior in capability of allowing the lubricant to ooze into/out of the sealing member and inferior in wear proof, compared with the wiper seal 14 constructed according to the present invention.

What is claimed is:

1. A linear motion guide system with a wiper seal, comprising:
    a guide rail made thereon with a lengthwise raceway surface; and
    a slider allowed to move on the guide rail in a sliding manner through a plurality of rollers;
    the wiper seal installed on any one of forward and aft ends of the slider, the wiper seal comprising a compact sheet of a precursor polyester polyurethane foam having a skeleton texture of a porous three-dimensional construction the compact sheet having a thickness equal to one tenth of the thickness of the precursor polyester polyurethane foam and further having a reticular skeleton texture including compacted continuous cells that spread uniformly throughout the compact sheet to have a density of 0.58 g/cm$^3$ and a porosity of 52%, and the compacted continuous cells in the wiper seal being impregnated with lubricant;
    a cassette installed on the slider, the wiper seal disposed within the cassette such that the cassette fits over the wiper seal and an inward edge of the wiper seal surrounds the guide rail and is in sliding engagement with the guide rail to exert an interference with the guide rail;
    wherein the cassette comprises a locating pin therein and the wiper seal has a raised portion that moves into sliding engagement with the raceway surface, the wiper seal being put inside the cassette such that the locating pin fits into the raised portion of the wiper seal;
    wherein the cassette comprises an end wall of which an inward edge around the guide rail is kept from touching the guide rail with a clearance and a closure sheet stowed in the cassette in opposition to the end wall in a way that an inward edge around the guide rail is also kept from touching the guide rail with a clearance, and the wiper seal fits between the end wall and the closure sheet; and wherein the compacted continuous cells exhibit capillary action and porosity sufficient to soak up and hold the lubricant therein, thereby permitting seepage of lubricant out of or into the compacted continuous cells.

2. A linear motion guide system constructed as defined in claim 1, further comprising a mounting plate that secures the cassette having the wiper seal therein to one end of the slider, wherein the mounting plate is placed on an outward surface of an end seal lying on the one end of the slider, the mounting plate having a recess defined therein to fit over a lip of the end seal; and the mounting plate having a locating hole into which the locating pin in the cassette is engaged.

3. A linear motion guide system constructed as defined in claim 1, wherein the cassette has a surrounding side wall that is made in a double-walled construction to ensure some rigidity, the double construction having an internal surrounding frame coming into contact with peripheral edges of wiper seals and an external surrounding frame encircling the internal surrounding frame, and the internal surrounding frame and the external surrounding frame being joined together with ribs.

4. A linear motion guide system with a wiping means, comprising a guide rail made thereon with a lengthwise raceway surface and a slider allowed to move on the guide rail in a sliding manner through a plurality of rollers;

wherein the wiping means is attached through a mounting plate to an outward surface of an end seal on one end of the slider, the wiping means being composed of a wiper seal assembly and a scraper installed on an outward surface of the wiper seal assembly, the wiper seal assembly being comprised of a cassette, a pair of wiper seals stowed inside the cassette, and a closure sheet stowed in the cassette so as to come into mating with the mounting plate;

the wiper seals each comprising a compact sheet of a precursor polyester polyurethane foam having a skeleton texture of a porous three-dimensional construction, the compact sheet having a thickness equal to one tenth of the thickness of the precursor polyester polyurethane foam and further having a reticular skeleton texture including compacted continuous cells that spread uniformly throughout the compact sheet to have a density of 0.58 g/cm³ and a porosity of 52%, and the compacted continuous cells in the wiper seal being impregnated with lubricant; and the pair of wiper seals being placed such that the compacted continuous cells in the wiper seals are exposed over a total surface of the wiper seals which bear against an outside surface of the guide rail and mating surfaces of the cassette including an inward wall surface of an internal surrounding frame of the cassette, an inward surface of an end wall of the cassette, and the closure sheet.

\* \* \* \* \*